United States Patent

Ganz

(10) Patent No.: US 9,100,062 B2
(45) Date of Patent: Aug. 4, 2015

(54) ANTENNA ASSEMBLY AND METHOD OF USE OF THE ANTENNA ASSEMBLY

(71) Applicant: Harman Becker Automotive Systems GmbH, Karlsbad (DE)

(72) Inventor: Armin Ganz, Bietigheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 184 days.

(21) Appl. No.: 13/766,395

(22) Filed: Feb. 13, 2013

(65) Prior Publication Data

US 2013/0210349 A1 Aug. 15, 2013

(30) Foreign Application Priority Data

Feb. 14, 2012 (EP) .................................. 12 155 449

(51) Int. Cl.
| | |
|---|---|
| *H04B 5/00* | (2006.01) |
| *H01Q 1/22* | (2006.01) |
| *H01Q 1/32* | (2006.01) |
| *H01Q 1/38* | (2006.01) |
| *H01Q 7/00* | (2006.01) |

(52) U.S. Cl.
CPC ........... *H04B 5/0081* (2013.01); *H01Q 1/2208* (2013.01); *H01Q 1/3291* (2013.01); *H01Q 1/38* (2013.01); *H01Q 7/00* (2013.01); *H04B 5/0075* (2013.01)

(58) Field of Classification Search
CPC ........... H01Q 1/223; H01Q 1/32; H01Q 3/20; H01Q 3/26; H01Q 7/00; H01Q 9/00; H04B 5/0056; H04B 5/0075; G06K 19/0708; G06K 19/0723

USPC .......................................................... 455/41.1
See application file for complete search history.

(56) References Cited

U.S. PATENT DOCUMENTS

| | | | | |
|---|---|---|---|---|
| 3,644,825 | A * | 2/1972 | Davis et al. | 324/207.26 |
| 7,282,916 | B2 * | 10/2007 | Eberlein et al. | 324/318 |
| 7,663,502 | B2 * | 2/2010 | Breed | 340/12.25 |
| 2002/0093331 | A1 * | 7/2002 | Rochelle | 324/247 |
| 2005/0057422 | A1 | 3/2005 | Deguchi et al. | |

(Continued)

FOREIGN PATENT DOCUMENTS

| | | |
|---|---|---|
| EP | 1189306 A1 | 3/2002 |
| JP | 2000138621 A | 5/2000 |

(Continued)

OTHER PUBLICATIONS

European Search Report for corresponding Application No. 12155449.7, mailed Jun. 13, 2012, 8 pages.

*Primary Examiner* — Simon Nguyen
(74) *Attorney, Agent, or Firm* — Brooks Kushman P.C.

(57) ABSTRACT

Various embodiments relate to an antenna assembly for providing wireless coupling to a remote antenna. The antenna assembly comprises a first antenna and a second antenna. The second antenna is fixedly attached to a mount spaced by a distance along a first direction from the first antenna. The first antenna is configured to provide the wireless coupling along the first direction via transceiving of a time-varying field. The second antenna is configured to provide the wireless coupling by setting-up a decay of the time-varying field along the first direction. The interface is connected to an electric circuitry configured for controlling the transceiving. The second antenna is configured to operate as a passive electrical element.

20 Claims, 9 Drawing Sheets

(56) References Cited

U.S. PATENT DOCUMENTS

| | | | |
|---|---|---|---|
| 2006/0050005 A1* | 3/2006 | Shirosaka et al. | 343/844 |
| 2008/0299904 A1* | 12/2008 | Yi et al. | 455/41.1 |
| 2009/0256779 A1* | 10/2009 | Wang et al. | 343/893 |
| 2009/0309703 A1 | 12/2009 | Forster | |
| 2011/0210824 A1* | 9/2011 | Stewart | 340/10.1 |
| 2012/0184338 A1* | 7/2012 | Kesler et al. | 455/572 |
| 2013/0181876 A1* | 7/2013 | Miura et al. | 343/788 |
| 2014/0062211 A1* | 3/2014 | Hamam et al. | 307/104 |

FOREIGN PATENT DOCUMENTS

| | | |
|---|---|---|
| JP | 2002353725 A | 12/2002 |
| JP | 2009021970 A | 1/2009 |

* cited by examiner

ANTENNA ASSEMBLY AND METHOD OF USE OF THE ANTENNA ASSEMBLY

CROSS-REFERENCE TO RELATED APPLICATIONS

This application claims priority to EP Application No. 12155449.7 filed on Feb. 14, 2012, the disclosure of which is incorporated in its entirety by reference herein.

TECHNICAL FIELD

Various embodiments relate to an antenna assembly for providing wireless coupling to a remote unit and to a method of use of such an antenna assembly.

BACKGROUND

Near-field communication (NFC), which employs wireless coupling via time-varying electromagnetic fields is increasingly employed.

Various applications are conceivable, where for example a wireless bi-directional data link is established between a remote unit and a stationary unit. Applications include payload data transfer, identification and authentication, personalization of the remote unit, cashless paying, etc. Typical NFC transceivers are designed in order to provide a wireless coupling up to distances of roughly 5-10 cm. The operation frequency is typically 13.56 MHz. Such transceivers employ antennas comprising substantially planar conducting paths which are arranged, for example, in a circular or winding manner in order to provide a large inductive coupling to a time-varying alternating current (AC) magnetic field (H-field). The coupling with the remote antenna is then achieved via a spatially decaying, time-varying electromagnetic field. In particular, the coupling may only exist up to a certain distance between the two antennas as defined by the decay.

Moreover, typical antennas have directional emission characteristics that provide a large inductive coupling to an AC H-Field and therefore wireless coupling in a direction substantially perpendicular to the plane as defined by the mostly planar conducting paths. Here, the antenna may be sensitive in a narrow or wider solid angle centered around the direction. Electronic circuitry is coupled to the conducting paths and allows for controlling of the transceiving (i.e., driving current through the conducting paths and thereby generating the AC H-field, as well as measuring current driven through the conducting paths by a remotely generated AC H-field).

However, because typically the wireless coupling is restricted to a range of 5-10 cm and a comparably narrow solid angle around the direction, the flexibility in the arrangement of the antenna is limited when at the same time coupling with a low likelihood of transmission errors is desired. In particular, if the electric circuitry for controlling the transceiver is spacious, a degraded wireless coupling strength may be obtained due to restrictions imposed on the placement of the antenna and the connected electric circuitry. This may result in increased rate of failure for data transmission.

Accordingly, a need exists to provide an antenna assembly for providing wireless coupling to a remote antenna with increased flexibility of the arrangement. In particular, a need exists for providing an antenna assembly which allows for stronger wireless coupling to the remote antenna and therefore a reduced rate of failure in wireless data transmission by means of the wireless coupling.

SUMMARY

This need is met by the features of the independent claims. The dependent claims define embodiments.

An aspect of the invention relates to an antenna assembly for providing wireless coupling to a remote antenna. The antenna assembly comprises a first antenna and a second antenna. The first antenna comprises an interface and is configured to provide the wireless coupling along a first direction via transceiving of a time-varying field. The interface is connected to an electric circuitry configured for controlling the transceiving. The second antenna is fixedly attached to a mount and spaced by a distance along the first direction from the first antenna. The second antenna is configured to provide the wireless coupling via setting up a decay of the time-varying field along the first direction, wherein the second antenna is configured to operate as a passive electrical element.

For example, the wireless coupling may rely on inductive coupling to a time-varying (AC) magnetic field (H-field). The wireless coupling may be near-field wireless coupling. In this regard, the distance may be configured such that the second antenna is positioned in the near-field regime of the transceived time-varying field. Layouts of antennas are known to the skilled person which allow for generation and detection (i.e., transceiving of AC H-fields). This may occur via inductive coupling to the AC H-field employing winding conducting paths. In particular, via their layout, the frequency of the antenna and/or antenna assembly may be set such that the antenna and/or antenna assembly is sensitive (i.e., where inductive coupling to the AC H-field is large). For example, in the case of near-field coupling (NFC) data transmission, the frequency may be 13.56 MHz. The controlling, (i.e., the driving and measuring of the AC H-field) may be achieved using the electric circuitry, for example, as a printed circuit board (PCB). In this case, the driving may correspond to generating a current flow through the conducting paths for emitting an H-field for transmission from the first antenna. Also, detection may correspond to measuring a current flow inductively generated from an AC H-field (e.g., emitted from a remote antenna and picked up by the first antenna). In other words, the electric circuitry may provide energy for H-field generation or may absorb energy for H-field read-out. Information may be encoded into the AC H-field (e.g., into the time-dependence). Bi-directional data communication to and from the remote antenna may be achieved. In other words, the first antenna may be an active element, while the second antenna is a passive element.

Setting up of the decay may correspond to setting up of a spatial decay rate. Typically, in the near-field regime, a spatial decay rate may be described by an $r^{-3}$ dependency, where r denotes the distance to the lateral plane of the antenna. The second antenna may be configured to alter this dependency to another, possibly more complex, polynomial or exponential dependency. In particular, it may be desired to have a weaker decay if compared to the $r^{-3}$ dependency, therefore, allowing signal propagation over longer distances.

Typically, such antennas may also have directional emission characteristics (i.e., may have a dependence of the sensitivity of inductive coupling to the AC H-field on the spatial orientation of the AC H-field). There may be the first direction and possibly a solid angle around the first direction of comparably large sensitivity (i.e., where the coupling is provided), and a further direction of comparably low sensitivity, (i.e., where the coupling is provided to a smaller degree). Therefore, directional emission characteristics address the generation and detection of AC H-fields. In other words, when generating an AC H-field, the energy stored in the field is radiated away from the antenna predominantly in the first direction or a finite solid angle with respect to the lateral extensions of the first antenna. Several design rules are known to the skilled person, which address the directional emission characteristics.

Moreover, such antennas may have a spatial decay characteristic (i.e., may exhibit a spatial decay of the AC H-field), in particular, along the first direction. If the AC H-field decays rapidly in space, the distance over which the coupling may be provided may be short. For isolated NFC antennas at 13.56 MHz, the typical decay may be in the order of 2-10 cm, as for example depending on the antenna parameters such as size, electrical power fed into the antenna and so forth. Techniques are known which allow for the setup of a decay of the magnetic field. In particular, there may be a correlation between the directional emission characteristics and the decay. If, for example, a comparably selective directional emission characteristic is desired (i.e., where the energy of the AC H-field is focused to a large degree along the first direction or a narrow, respectively aligned solid angle), the decay may be comparably longer.

When the second antenna is spaced by a distance along the first direction from the first antenna (i.e., along the direction where the first antenna provides large inductive coupling), the decay of the AC field may be set up according to various needs. In particular, a longer decay may be achieved for the antenna assembly comprising the first and second antennas when compared to the case of not utilizing part of the invention where only the first antenna is present. In other words, when driving an AC H-field, the available energy may be spread out along the first direction providing comparably smaller maximum field amplitudes close to the first antenna, but comparably larger maximum field amplitudes away from the first antenna along the first direction.

For example, the second antenna may be spaced by the distance along the first direction being on the same order of magnitude as lateral dimensions perpendicular to the first direction of the first and second antennas. The second antenna may be positioned such that the physical regime of near-fields being transceived by the first antenna is addressed. The distance along the first direction may correspond to a lateral dimension multiplied by a factor of 0.5 or 2, or 0.7 to 1.2, or even 0.2 to 5.

Because the first antenna is used for transceiving (i.e., driving and detecting the time-varying field or an active element), the connection to the electric circuitry may be essential. Flexibility in arrangement may be limited. For example, there may be cases where the first antenna is integrated into a printed circuit board (PCB) (i.e., provided on-chip). While the antenna may be comparably small (e.g., have planar dimensions perpendicular to the first direction of that may be 3 cm×1.5 cm or 4 cm×2.5 cm or 5 cm×3.5 cm or other comparable value), the PCB may be larger by a factor of 2 or 10 or even 20. Moreover, the PCB may be in need for wired electrical connections to further electronics (e.g., a vehicle bus system or processor). This may impose restrictions on the flexibility in placement of the PCB and, therefore, of the antenna. Reduced wireless coupling to a remote unit may result, because of the restrictions on said arrangement.

In an embodiment having planar dimensions of the first antenna as set forth above, the distance along the first direction may amount to a value in the range of 2-10 cm, or 4-6 cm.

When the passive second antenna is placed along the first direction and configured to provide the coupling via setting up the decay of the AC field, the effect of increased wireless coupling may be achieved (e.g., if compared to the case in not utilizing part of the invention where the active first antenna is used in isolation).

The first antenna may comprise substantially planar conducting paths being arranged substantially orthogonal to the first direction and the second antenna may comprise substantially planar conducting paths being arranged substantially orthogonal to a second direction. For example, the planar conducting paths may be arranged winded (i.e., may form a coil). This may provide a large inductive coupling to the AC H-field, i.e., may provide large wireless coupling. In such a case, a particularly large inductive coupling may be provided for AC H-fields being orientated perpendicular to the plane defined by the conducting paths. It may, however, also be possible that the conducting paths are arranged on a curved surface. This may affect the directional emission characteristics. However, it may be possible to compensate for the effect of a curved surface by adapting the lateral arrangement of the conducting paths.

The planar conducting paths of the second antenna may have planar dimensions larger than planar dimensions of the planar conducting paths of the first antenna and/or the number of the planar conducting paths of the first antenna may be different than the number of the planar conducting paths of the second antenna. In general, the geometrical layout of the first and second antennas may differ. For example, via the geometrical layout of the planar conducting paths it may be possible to set up the decay appropriately. The planar dimensions may be of the same order of magnitude as the distance between the first and second antennas.

In particular, it may be possible that the second direction is substantially parallel to the first direction. In other words, the planes defined by the planar conducting paths of the first and second antennas may be substantially parallel. This may have the effect of a particular strong inductive coupling between the second antenna and the AC H-field transceived by the first antenna. The decay may be set up appropriately. However, it should be understood that under certain requirements it may be desired to have a small angle between the first direction and the second direction (e.g. 5°, or 10°, or up to 45°). In such a case, the inductive coupling between the second antenna and the AC H-field transceived by the first antenna may still be sufficiently strong. However the decay may be set up as desired. For example, the directional emission characteristics may be altered.

The first antenna may have a first eigenfrequency and the second antenna may have a second eigenfrequency. The second eigenfrequency may be substantially equal to the first eigenfrequency. The eigenfrequencies may relate to the resonance frequencies of the antennas in an isolated state (i.e., not arranged in the antenna assembly). The eigenfrequencies may be dependent on the inductance, capacitance, and load of the antenna. Accordingly, depending on the geometrical layout and possibly additional means for setting up the inductance, capacitance, and load (e.g., matching circuits), the eigenfrequencies may be set according to the needs. Typically, a spectral response of an antenna may have a local maximum or absolute maximum at the eigenfrequency and may have a finite distribution of spectral power around the eigenfrequency, (i.e., have a bandwidth). This finite distribution may be related to a Lorentzian function. Substantially equal may mean that the second eigenfrequencies lies within the bandwidth of the spectral response of the first antenna and vice versa. This may allow for coupled oscillators. A formalism to describe this scenario may be the one of coupled bandpass filters. In the case of coupled oscillators, the coupled system formed by the antenna assembly may be described by a characteristic resonance frequency. The various effects such as frequency-locking, coupling, over-coupling, etc., are known to the skilled person such that there is no need to discuss details in this context.

In this regard, a first eigenfrequency of the first antenna and a second eigenfrequency of the second antenna may be different to a resonance frequency of the antenna assembly. Such an effect may be obtained for the first and second antennas in the physical regime of over-coupled inductances. Side lobes of the eigenfrequencies of the first and second antennas may form the resonance frequency of the antenna assembly.

In this regard, the antenna assembly may have two resonance frequencies and the antenna assembly may be configured such that one of the two resonance frequencies is substantially equal to an eigenfrequency of the remote antenna. In case of NFC data communication, the remote antenna may be configured to transmit and receive at 13.56 MHz. In this case, as for example, in the case of over-coupled first and second antennas, two local maxima of the spectral response of the antenna assembly (i.e., two resonance frequencies) may exist. This may be corresponding to side lobes of the eigenfrequencies of the first and second antennas. Here, it may be desirable to configure the first and second antennas and the antenna assembly such that the value of one of the two resonance frequencies equals the eigenfrequency of the remote antenna.

Furthermore, it may be desirable to configure the antenna assembly such that one of the side lobes or both side lobes have a predetermined spectral width (e.g., full width at half maximum (FWHM)). A typical value may be 800 kHz. By setting geometrical parameters, e.g., distances, planar dimensions, etc., of the antenna assembly and/or the first antenna and/or the second antenna it may be possible to obtain the predetermined spectral width.

The mount may be a plastic cover. In such a case, the second antenna may be attached to a back surface of the cover or structurally incorporated into the cover. For example, the plastic cover may be fabricated by means of injection molding. Then the second antenna may be structurally incorporated (i.e., entirely contained) inside the plastic part. This may have the effect that the antenna is not visible to the eye, but at the same time is located close to a front surface of the cover and therefore set up the decay of the AC field in a desired manner. The coupling may be provided respectively.

In particular, the cover may have a curved shape. Then the second antenna having conducting paths may adopt the curved shape. For example, the conducting paths may follow the curved shape. In another example, the cover may be shell member which delimits a passenger cell of a vehicle and therefore may support the second antenna at a fixed location relative to the first antenna.

In this regard, the first antenna may comprise conducting paths arranged on a rigid substrate and/or the second antenna may comprise conducting paths arranged on a flexible substrate. Techniques are known which allow arranging conducting paths on a flexible substrate (e.g., polymide). The first antenna may be integrated with the PCB having a rigid substrate. The second antenna being arranged on a flexible substrate may have the effect of increased flexibility in the arrangement on or in the mount/cover. This may reduce restrictions on the arrangement and in turn increase the wireless coupling by setting up the decay in a favourable fashion.

It may be possible that the second antenna is statically direct current (DC) decoupled from it surrounding and/or DC-decoupled from the first antenna. While there may be an AC-coupling between the first and second antennas as set forth above, there may be no wired connection. This may further increase the flexibility in the arrangement of the second antenna on or in the mount/cover. Restriction on the arrangement is further reduced and the decay may be set up as desired, thereby increasing the coupling.

The second antenna may be configured to provide the wireless coupling via setting up a decay of the time-varying field perpendicular to the first direction. In particular, this may relate to the directional emission characteristics. For example, in case the second antenna has larger planar dimension (e.g., perpendicular to the first direction) than the first antenna, the directional emission characteristics may be widened if compared to the isolated first antenna (e.g., relate to a wider solid angle of large inductive coupling to the AC H-field). A larger amount of radio frequency (RF) energy may be emitted away from the first direction and may not or only to a lesser degree couple with the second antenna.

In general, the second antenna may be configured set up the decay (e.g., parallel and/or perpendicular) to the first direction by means of respectively adjusted parameters selected from the group consisting of: (i) dimensions in the plane substantially perpendicular to the first direction, (ii) a second eigenfrequency of the second antenna, and (iii) a distance along the first direction. With such parameters, it may be possible to set up the decay of the AC H-field. For example, a smaller (or larger) distance along the first direction may result in a shorter (longer) decay along the first direction. For example, smaller (or larger) dimensions in the plane substantially perpendicular to the first direction may result in a shorter (or longer) decay along the direction perpendicular to the first direction. This is merely illustrative and other dependencies may apply.

According to a further aspect, the invention relates to a vehicle comprising such an antenna assembly as described herein.

Effects may be obtained which are comparable to the effects obtained for an antenna assembly according to a further aspect as set forth above.

In general, when the first antenna is operated as an active element to drive and detect the time-varying field and the second antenna is operated as a passive electrical element to set up the decay of the time-varying field, an increased flexibility in the arrangement and design of the antenna assembly may be achieved. At the same time, wireless coupling may be provided with comparably high transmission quality and reliability. In particular, when the antenna assembly is employed in an environment which imposes several restrictions on the arrangement of the first antenna being connected to the PCB, such as a middle console of a vehicle or the like, flexibility may be obtained by providing the second antenna at places where no electrical wiring is accessible or possible. Because there may be no wired connection to and from the second antenna, its placement and arrangement is versatile.

According to a further aspect, a method of use of the antenna assembly according to a further aspect as set forth above is provided. The method of use relates to near-field data communication between a vehicle computer of a vehicle and a portable electronic device. Various methods of use are conceivable, including identification, authorization, cashless paying, etc.

Effects may be obtained which are comparable to the effects obtained for an antenna assembly according to a further aspect as set forth above.

According to another embodiment, there is provided an antenna assembly for wireless near-field communication between an electronic circuit of a vehicle and a portable electronic device located in a passenger cell of the vehicle. The antenna assembly comprises a first antenna coupled to the electronic circuit and a second antenna. A shell member which delimits the passenger cell may support the second antenna at a fixed location relative to the first antenna, such that the shell member hides the second antenna from view when seen from the passenger cell. The shell member may be a portion of an instrument panel or of a center console of the vehicle. The second antenna may be a passive repeater antenna tuned in accordance with the first antenna. The passive repeater antenna may be structurally integrated with the vehicle at a boundary of the passenger cell, to thereby enhance coupling between the electronic circuit and the portable electronic device located in the passenger cell.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

The foregoing and additional features and advantages of the invention will become apparent from the following detailed description when read in conjunction with the accompanying drawings, in which like reference numerals refer to like elements.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
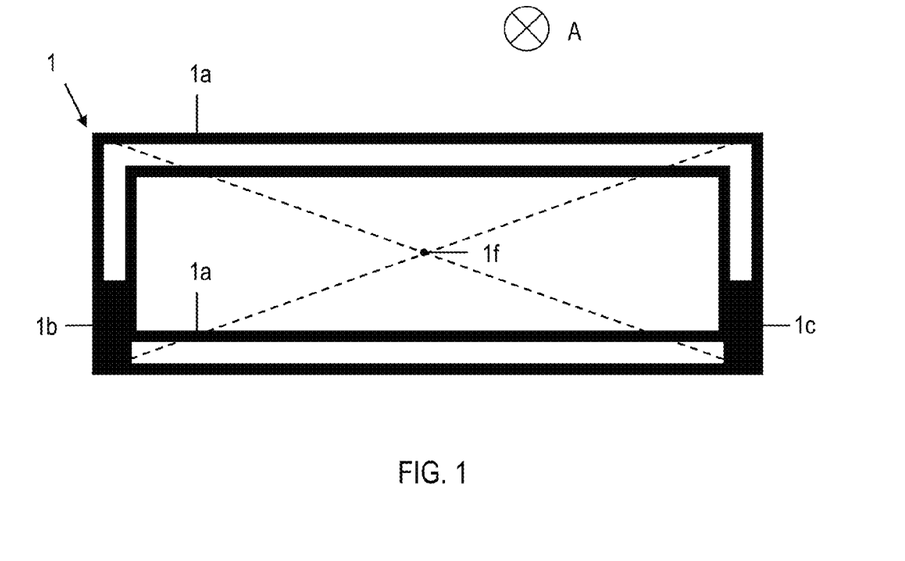
FIG. 1 is a top view of an antenna comprising an interface.

FIG. 1 shows a first antenna 1 being configured to provide wireless coupling via transceiving of a time-varying (AC) field along a first direction A. The AC field may be a magnetic field (H-field). The first direction A is orientated perpendicular to the drawing plane of FIG. 1. The first antenna 1 comprises two circularly arranged and substantially planar conducting paths 1a. The conducting paths 1a are provided on a substrate (not shown in FIG. 1). The conducting paths 1a define a center 1f of the first antenna 1 as indicated by the dashed lines. Furthermore, the first antenna 1 comprises an interface 1b which is configured to be connected to an electric circuitry (not shown in FIG. 1). The electric circuitry can be used for controlling the transceiving (i.e., run electrical current through the conducting paths 1a in order to drive the AC H-field), as well as measure the current through the conducting paths 1a in order pick-up a time-varying field which is generated at a remote antenna (not shown in FIG. 1). Therefore, the first antenna 1 is configured to operate as an active electrical element. In other words, the electric circuitry can be used in order to measure the AC-inductance of the antenna 1. Inductive coupling is provided to the AC H-field by the layout of the conducting paths 1a. Namely, a design of the antenna 1 as shown in FIG. 1 is able to generate or pick-up a AC H-field via the conducting paths 1a forming a coil or partial coils or windings of a coil.

In particular, the geometrical parameters of the conducting paths 1a, as well as additional means 1c for adjusting the inductance and/or the load and/or the capacitance of the antenna can be used in order to tailor the electrical characteristics of the first antenna 1. These characteristics include, for example, an eigenfrequency of the antenna 1, load-matching, as well as directional emission characteristics. The latter can relate to directions where the amplitude of the time-varying magnetic field is large or small and the decay of the magnetic field, for example, along the first direction A, is large or small. The skilled person knows various ways of predicting or optimizing these parameters of the first antenna 1 according to the particular needs imposed by the type of the wireless coupling. Therefore, there is no need to discuss further details of the design of the first antenna 1 in this context.

Figure 2:
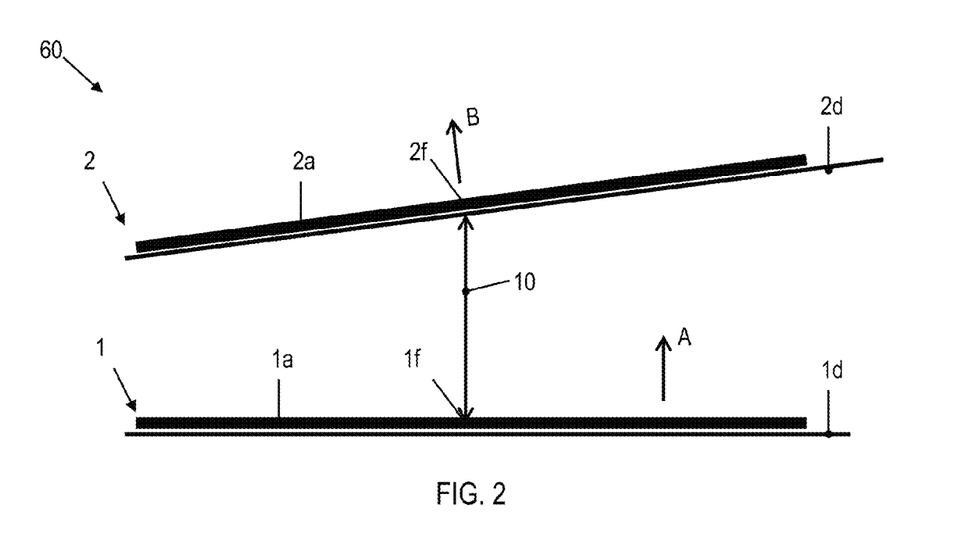
FIG. 2 is a side-view of an antenna assembly according to an embodiment of the present invention.

In FIG. 2, an antenna assembly 60 according to an embodiment of the present invention is shown. The antenna assembly 60 consists of the first antenna 1 as discussed with respect to FIG. 1 and a second antenna 2. The second antenna 2 also comprises conducting paths 2a, which are comparable to the conducting paths 1a of the first antenna 1. In particular, comparable design rules as set forth above with respect to FIG. 1 in order to configure the electrical parameters of the second antenna 2 may apply to the present case. FIG. 2 depicts a substrate 2d on which the conducting paths 2a of the second antenna 2 are mounted. FIG. 2 also depicts a substrate 1d onto which the conducting paths 1a of the first antenna 1 are mounted. For example, the substrates 1d, 2d can be rigid or flexible. In particular, it may be desirable to mount the conducting paths 2a of the second antenna 2 onto a flexible substrate 2d. In addition, it may also be desirable that the substrate 1d is rigid.

In one embodiment, the second antenna 2 does not comprise an interface for coupling the second antenna 2 to electric circuitry being configured to control the transceiving. In particular, in one embodiment the second antenna 2 can be statically DC-decoupled from other electrical units, in particular from the first antenna 1. Therefore, the second antenna 2 may act as a passive electrical element. As can be seen from FIG. 2, the second antenna 2 is arranged at a distance 10 away from the center 1f of the first antenna 1 along the first direction A. In other words, the second antenna 2 is spaced by the distance 10 along the first direction A. The antennas 1, 2 as spaced apart indicate that no wired electrical contact exists between the two antennas 1, 2. However, due to the design of the first antenna 1, its inductive coupling to the AC H-field is large along the first direction A. Therefore, the first antenna 1 emits and receives accordingly orientated AC H-fields. When, for example, the eigenfrequencies of the first and second antennas 1, 2 are substantially equal (i.e., at least within the spectral bandwidths of each other), and if the distance 10 is sufficiently small, AC-coupling of the first and second antennas 1, 2 occurs. The distance 10 for which AC coupling occurs may depend on the lateral dimensions of the conducting paths 1a, 2a.

As can be seen from FIG. 2, the conducting paths 1a of the first antenna 1 define a plane which has a normal being parallel to the first direction A. Respectively, the conducting paths 2a of the second antenna 2 define a plane which has a normal being parallel to a second direction B. In FIG. 2, the first and second directions A, B enclose a small angle (e.g. 5° or 10° but possibly up to 45°). However, in another embodiment, the directions A, B are parallel or substantially parallel with each other. A large inductive coupling to the AC H-field transmitted or received by the first antenna 1 is therefore provided for the second antenna 2. In general, it is also possible that because of the flexibility of the substrate 2d of the second antenna 2, the conducting paths 2a are curved. Then, the second direction B can be, for example, defined with respect to a plane through a center 2f of the second antenna 2.

Figure 3:
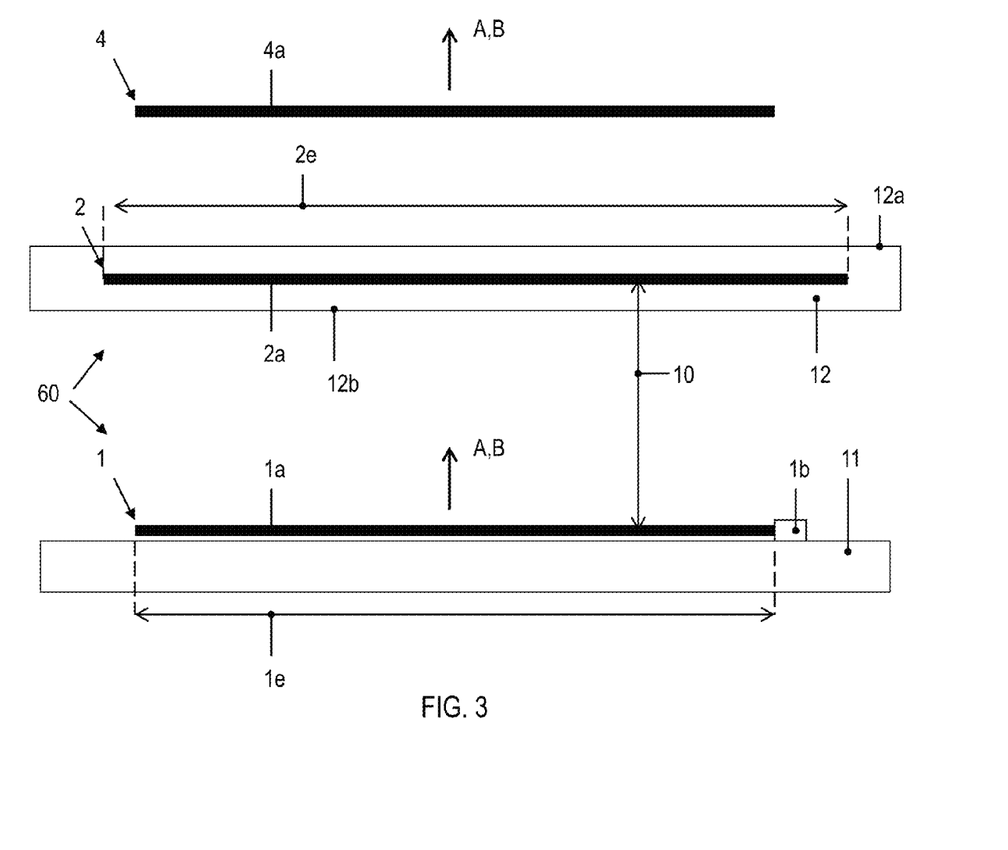
FIG. 3 is a side-view of an arrangement of a remote antenna and an antenna assembly according to an embodiment of the present invention.

With reference to FIG. 3, it is set forth how the wireless coupling to a remote antenna 4 is provided using the antenna assembly 60. The first antenna 1 is connected to electric circuitry 11, (e.g. a printed circuit board (PCB) on a rigid substrate (not shown)) via the interface 1b. In particular, the first antenna 1 can be integrated into the PCB 11 (e.g., on-chip). As can be seen from FIG. 3, the PCB 11 has planar dimensions which are comparably large if compared to the planar dimensions 1e of the first antenna 1. The dimensions 1e can be on the order of 3 cm×1.5 cm or 4 cm×2.5 cm or 5 cm×3.5 cm. The conducting paths 1a of the first antenna 1 are arranged such that the first antenna 1 provides large inductive coupling to the AC H-field along the first direction A being perpendicular to the plane defined by the conducting paths 1a. The PCB 11 drives and reads out currents flowing through the conducting paths 1a. Therefore, the first antenna provides the coupling via transceiving of the AC H-field. The PCB 11 provides and receives energy to and from the AC H-field (i.e., controls the transceiving).

Spaced by the distance 10 along the first direction A, with no wired connection in between, is the second antenna 2. Therefore, the second antenna 2 is placed where the AC H-field transceived by the first antenna 1 has a large amplitude. The second antenna 2 does not have an interface for coupling to an electric circuitry and does not have any other wired connection to the environment. Therefore, the arrangement and placement of the second antenna 2 is versatile and not limited by constructional restrictions. For example, when the substrate (not shown) of the second antenna 2 is flexible, the antenna may be incorporated as shown into a plastic cover or mount 12. Also the second antenna 2 has larger planar dimensions 2e than the dimensions 1e of the first antenna 1. For example, the dimensions 2e can be 8.56 cm×5.4 cm or 10 cm×7 cm or 15×10 cm. In another embodiment, the second antenna 2 may be attached to a front surface 12a or back surface 12b of the cover 12.

As can be seen from FIG. 3, the distance 10 is of the same order of magnitude as the dimensions 1e, 2e. This can be desired in order to provide AC coupling (e.g. for near-field coupling). For example, the distance 10 may be on the order of 0.5 cm or 2 cm or 10 cm or 20 cm, while the dimensions 1e, 2e may be on the order of 2-9 cm, respectively.

When AC-coupling between the antennas 1, 2 exists, the second antenna 2 is configured to set up a spatial decay of the AC H-field along the first direction A. For example, via the parameters of the distance 10, the geometrical design including dimensions, number of, spacing, width of the conducting paths 2a, the decay is set up. It should be understood that it is not necessary for setting up the decay that any wired electrical connection to electric circuitry is present for the second antenna 2. This is because the driving and reading-out of the AC H-field is achieved by the first antenna 1.

In particular, with reference to FIG. 3, the spatial decay set up via antenna 2 can be such that the distance between the remote antenna 4 and the first antenna 1 can be longer if compared to the case without the second antenna 2. Typically, a situation may occur where the placement of the first antenna 1 is limited because of limited flexibility in placement of the PCB 11 due to wiring, readout, electrical connection, sufficient available space, etc. Then poor transmission reliability of data connection via the coupling may be avoided by appropriately configuring the decay by means of the second antenna 2. The placement of the second antenna 2 is more versatile and flexible as no wired connection or the like needs to be provided.

Figure 4:
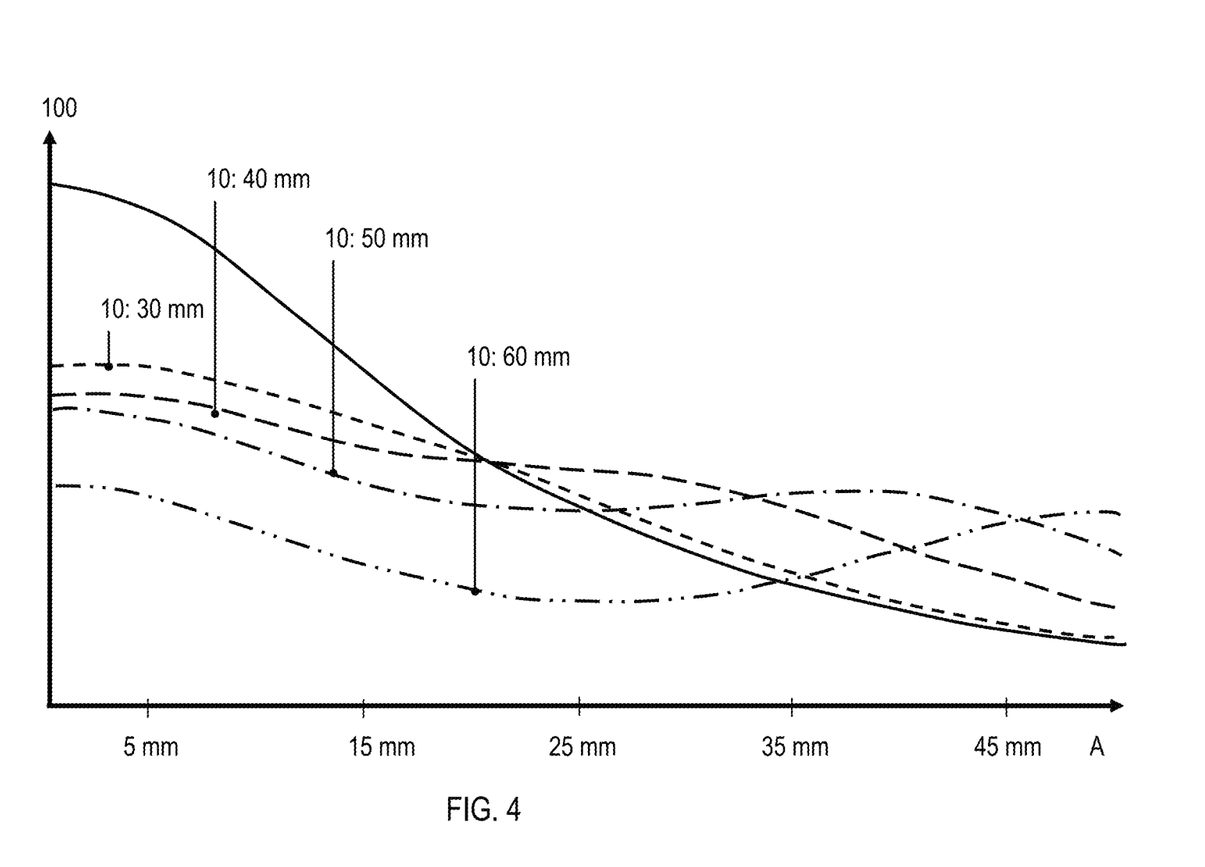
FIG. 4 illustrates the setting-up of a decay of the time-varying magnetic field along a first direction.

FIG. 4 schematically illustrates the setting up of the decay via the second antenna 2 in greater detail. Plotted is the dependence of a magnitude of the AC H-field 100 over the distance to the center 1f of the first antenna 1 along the direction A. The solid line depicts the AC H-field 100 for an antenna assembly which do not incorporate portions of the invention where no second antenna is present (i.e., only the first antenna 1). A characteristic decay is obtained.

By providing the second antenna 2 at distances 10 which amount to 3 cm (dotted curve), 4 cm (dashed curve), 5 cm (dashed-dotted curve), and 6 cm (dashed-dotted-dotted curve), the decay can be set up. In FIG. 3 the lateral dimensions 1e of the first antenna 1 amount to 4 cm×2.5 cm, while the lateral dimensions 2e of the second antenna 2 amount to 8.5×4 cm. In particular, the decay may be decreased for positions remote from the first antenna 1 along the first direction A. It should be understood that the decay can be set up also by the design of the planar conducting paths 2a which was not altered within the embodiments represented in FIG. 4. For example, it can be desired to reduce the dimensions or trim the conducting paths of both or either antennas 1, 2 in order to achieve an increased range (i.e., long decay). Also, other parameters can influence the decay.

Figure 5:
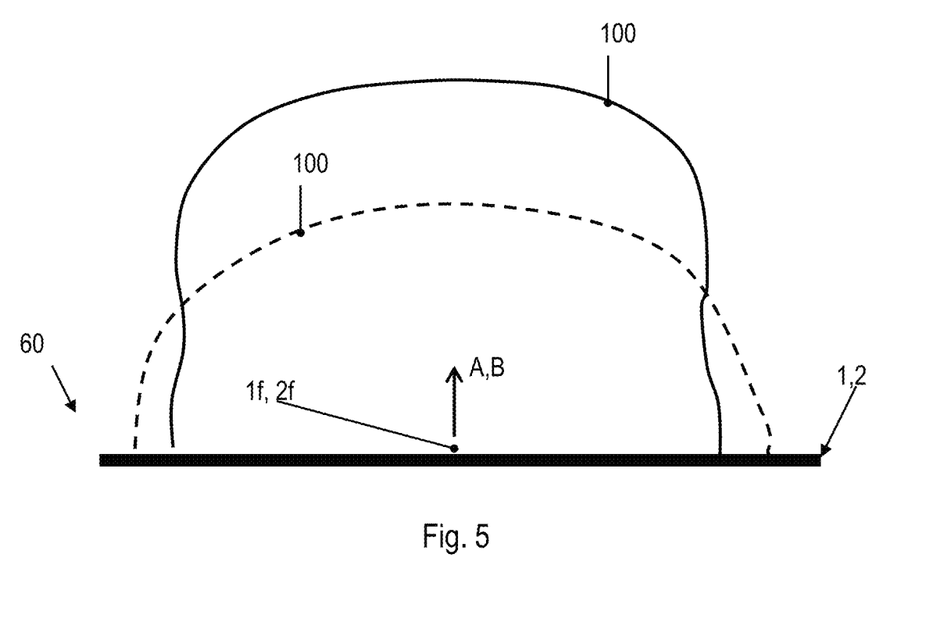
FIG. 5 illustrates directional emission characteristics in a contour line plot of the time-varying magnetic field.

FIG. 4 illustrates how the second antenna 2 is configured to provide the coupling via setting up a decay of the time-varying field 100 along the first direction A. However, it is also possible according to a further embodiment that the second antenna is configured to set up the decay time-varying field 100 along a direction perpendicular to the first direction A. This is depicted in FIG. 5, where the directional emission characteristics of the AC H-field 100 are depicted for the antenna assembly 60. FIG. 4 shows a contour line plot of isolines of the magnitude of the field 100.

Depending on the parameters of the second antenna 2, the field 100 is set up to provide narrow or broad directional emission characteristics with respect to the first direction A. In FIG. 5, the dashed line illustrates an isoline of constant magnitude of the field 100 without the presence of the second antenna 2 as a reference. The full line illustrates the respective isoline for a case where the second antenna 2 is present. Besides the field 100 being more far-reaching in the direction A, also a redistribution of the directional emission characteristics is obtained into a smaller solid angle.

For example, in the case where the planar dimensions 2e of the second antenna 2 are larger than the planar dimensions 1e of the first antenna 1, the directional emission characteristics may be widened. At the same time, a decay of the field 100 may increase (i.e., emission into a wider solid angle is achieved) at the cost of shorter coupling range.

FIGS. 4 and 5 are illustrative only. It is to be understood that various ways of designing and arranging the antenna assembly 60 and the first and second antennas 1, 2 exist. For example, the number, width and the spacing of the conducting paths 1a, 2a may be altered. The distance 10 may be altered. The type of conducting material, the substrate dielectric constant, the thickness of the substrate, the thickness of the conducting paths, the surrounding metallic parts may all have an influence on the strength and the type of the dependencies of FIGS. 4 and 5. Therefore, FIGS. 4 and 5 must not be construed as being limiting, but rather illustrative only.

Figure 6:
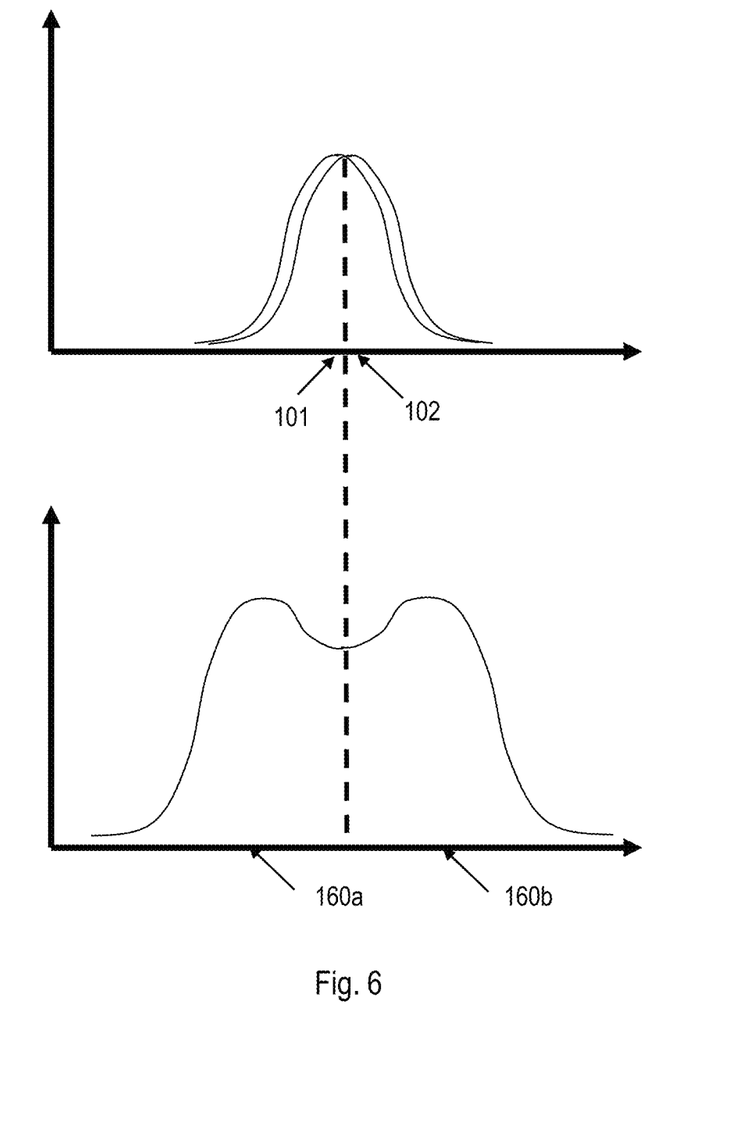
FIG. 6 illustrates eigenfrequencies of antennas and resonance frequencies of the antenna assembly according to an embodiment of the present invention.

In FIG. 6 the AC-coupling of the first and second antennas 1,2 is illustrated schematically. Plotted is the spectral response of the isolated antennas 1,2 in the upper part and of the antenna assembly 60 in the lower part.

The first antenna 1 has an eigenfrequency 101. The second antenna 2 has an eigenfrequency 102. As can be seen from the upper part of FIG. 6, the antennas 1, 2 have eigenfrequencies 101, 102 being substantially equal (i.e., closely adjacent in frequency space). The eigenfrequencies 101, 102 are each within the bandwidth of the respective other antenna 1,2.

Depending on the distance 10, a case of over-coupling can occur for the antenna assembly 60. This is shown in FIG. 6, bottom part. For the antenna assembly 60 in the case of over-coupling, two resonance frequencies 160a, 160b are obtained. The resonance frequencies 160a, 160b correspond to side lobes of the coupled inductances in the form of the antennas 1, 2.

When coupling to a remote antenna (not shown in FIG. 6), the antenna assembly 60 can be configured such that one of the resonance frequencies 160a, 160b equals the eigenfrequency of the remote antenna. Various techniques are known which allow for a respective design of the constituents of the antenna assembly 60 to achieve this; therefore there is no need to discuss this further in this context.

Figure 7:
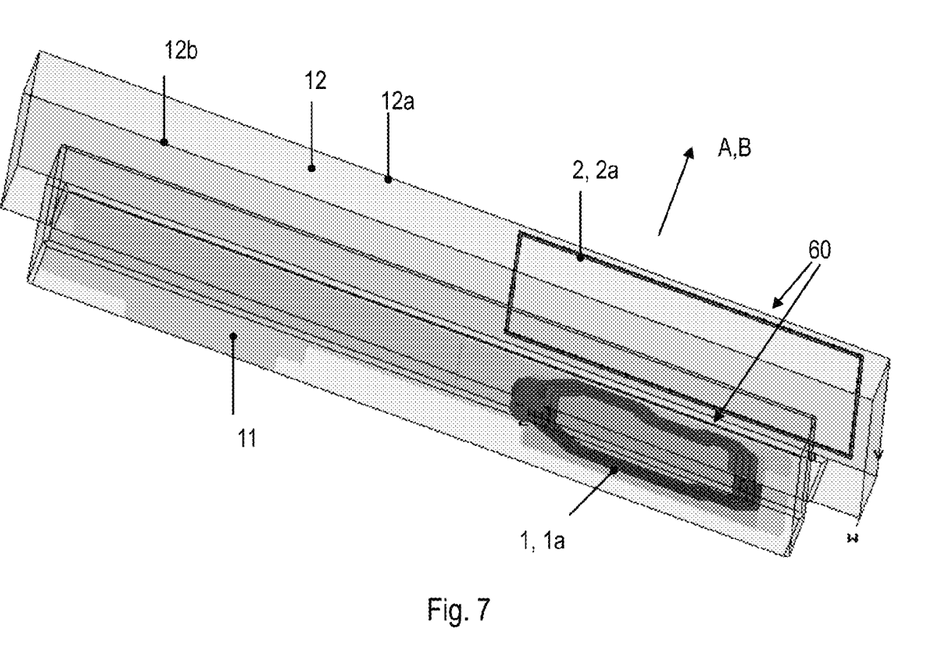
FIG. 7 shows an antenna assembly according to an embodiment of the present invention.

In FIG. 7, a perspective view of a further embodiment of the antenna assembly 60 is shown. The first antenna 1 is integrated into a PCB 11. The second antenna 2 is included in a plastic cover part 12 of a center console of a vehicle. The planar conducting paths 1a, 2a of the first and second antennas 1,2 extend in parallel planes, however, have different number of conducting paths as well as different planar layout. The second antenna 2 is arranged close to the front surface 12a of the cover 12. A user may place a portable communication device (not shown) close to the front surface 12a such that the antenna assembly 60 provides wireless coupling to the device. In particular, the coupling is provided for longer distances along the directions A,B away from the front surface 12a due to the presence of the second antenna 2.

Figure 8:
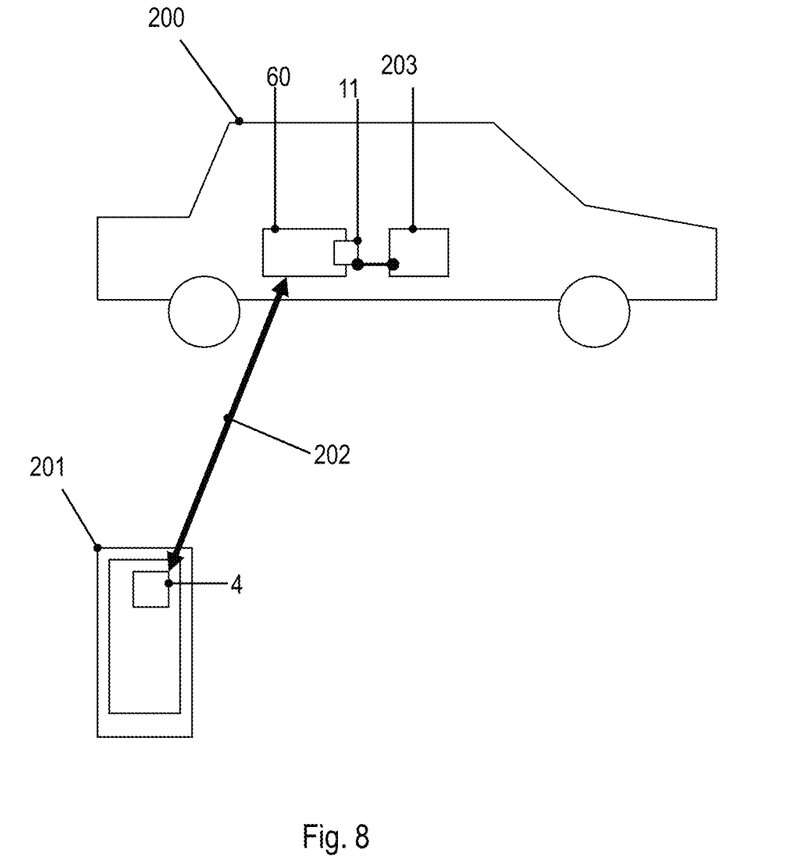
FIG. 8 illustrates near-field coupling between a remote antenna comprised in a portable communication device and an antenna assembly comprised in a vehicle according to an embodiment of the present invention.

FIG. 8 schematically illustrates the wireless coupling via NFC 202. A remote antenna 4 in a portable communication device 201 is wirelessly coupled to the antenna assembly 60 arranged in a vehicle 200. The antenna assembly 60 is connected to a vehicle computer 203 via the PCB 11. Various applications are conceivable such as identification, authentication, cashless paying, etc. Note that FIG. 8 is not drawn to scale. In particular the decay of the NFC 202 may be in the order of a few centimeters.

Figure 9:
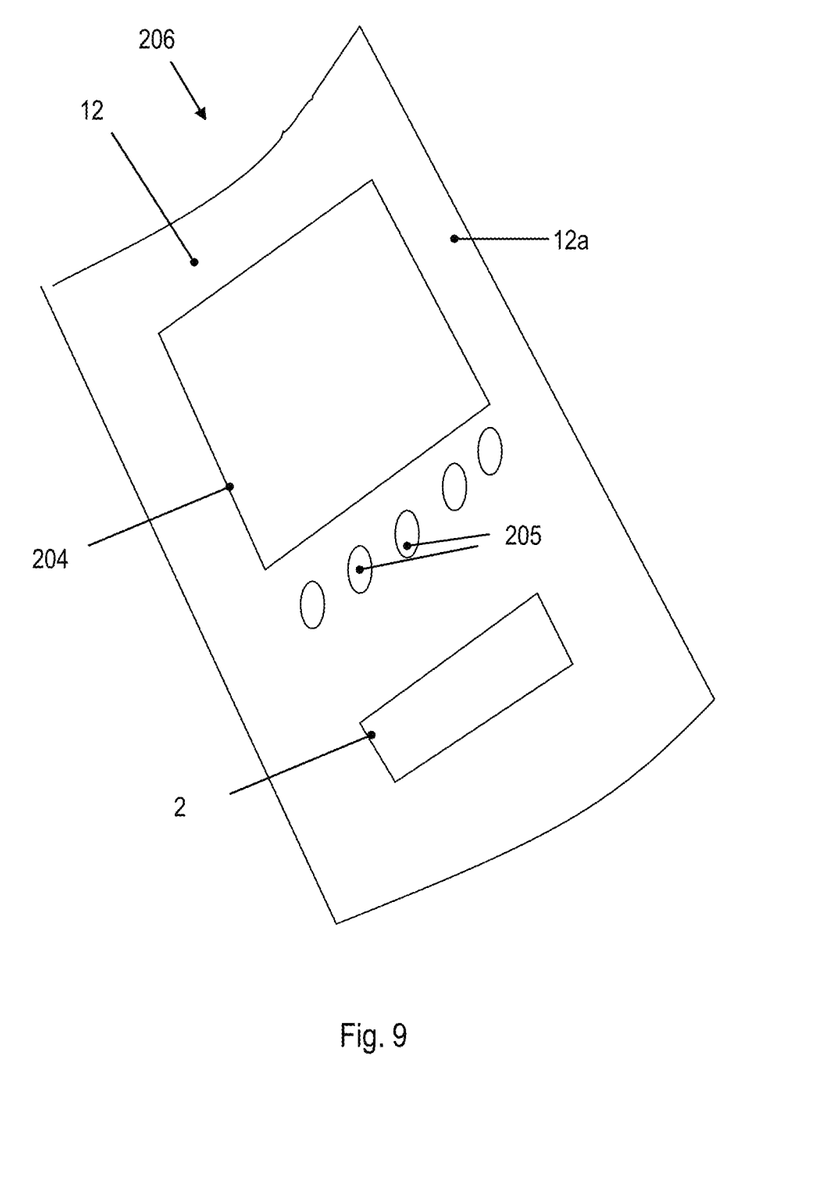
FIG. 9 is a schematic representation of a vehicle center console comprising a cover into which a second antenna of an antenna assembly according to an embodiment of the present invention is incorporated.

FIG. 9 schematically illustrates a center console 206 of the vehicle 200. The center console 206 comprises buttons 205 and a display 204. Underneath the display there is the second antenna 2 of the antenna assembly 60 integrated into the cover 12 of the center console. For example, the cover 12 may be a plastic part made by injection molding. The second antenna 2 has a flexible substrate to fully incorporate the second antenna 2 into the cover 12. The second antenna 2 may follow the curved shape of the cover 12. It is also possible that the second antenna 2 is attached to the back side 12b (hidden from view) of the cover 12. A user may place the portable communication device closely adjacent to the front side 12a of the cover 12 in order to establish the wireless coupling with the antenna assembly 60.

Figure 10A:
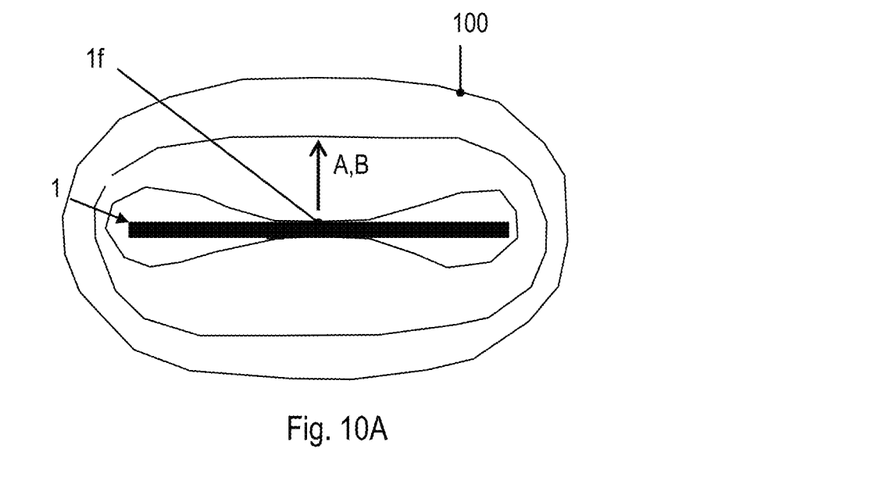
FIG. 10A is a contour plot of the isolines of the magnitude of the magnetic field for a case not forming part of the invention where only the first antenna is present.
Figure 10B:
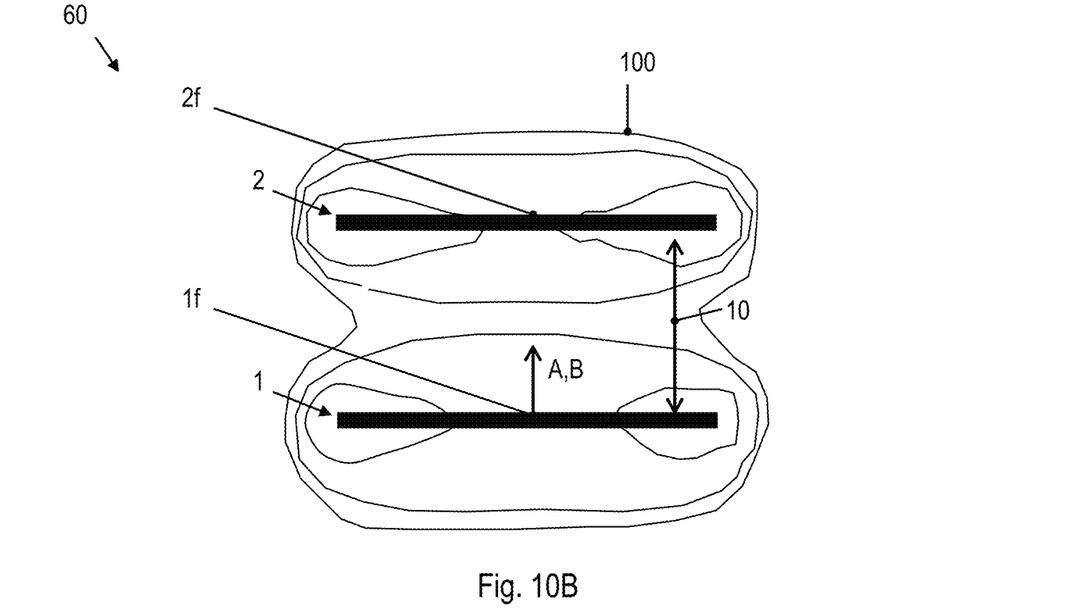
FIG. 10B is a contour plot of the isolines of the magnitude of the magnetic field for an embodiment of an antenna assembly according to the present invention.

In FIGS. 10A and 10B, contour plots of isolines of the magnitude of the magnetic field 100 are shown. In FIG. 10A, the case is shown where only the first antenna 1 is present. In FIG. 10B, the case is shown where the antenna assembly 60 comprising the first and second antennas 1,2 according to an embodiment of the invention is shown. As can be seen from, for example, a comparison of FIG. 10A with FIG. 10B, a more far-reaching magnetic field 100 in the direction 100 is obtained for the case of the antenna assembly 60 in FIG. 10B.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims. For example, while reference has been made predominantly to AC H-fields, it may be possible to employ AC electrical fields, respectively.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An antenna assembly for providing wireless coupling to a remote antenna, the antenna assembly comprising:
   a first antenna comprising an interface, wherein the first antenna is configured to provide the wireless coupling along a first direction by transceiving of a time-varying field, and wherein the interface is connected to electric circuitry for controlling the transceiving; and
   a second antenna for being fixedly attached to a mount and spaced by a distance along the first direction from the first antenna, wherein the second antenna is configured to provide the wireless coupling by setting up a decay of the time-varying field along the first direction, and wherein the second antenna is configured to operate as a passive electrical element.

2. The antenna assembly of claim 1, wherein the distance is configured such that the second antenna is positioned in a near-field regime of the transceived time-varying field.

3. The antenna assembly of claim 1, wherein a first eigenfrequency of the first antenna and a second eigenfrequency of the second antenna are different to a resonance frequency of the antenna assembly.

4. The antenna assembly of claim 3 including a first frequency and a second frequency and antenna assembly is configured such that one of the first frequency and the second frequency is substantially equal to an eigenfrequency of the remote antenna.

5. The antenna assembly of claim 1 wherein:
the first antenna comprises substantially planar first conducting paths being arranged substantially orthogonal to the first direction, and
the second antenna comprises substantially planar second conducting paths being arranged substantially orthogonal to a second direction.

6. The antenna assembly of claim 5, wherein the first conducting paths include first planar dimensions and the second conducting paths include second planar dimensions, the second planar dimensions being larger than the first planar dimensions; and wherein a number of first planar conducting planar paths is different than a number of second planar conducting paths.

7. The antenna assembly of claim 5, wherein the second direction is substantially parallel to the first direction.

8. The antenna assembly of claim 1, wherein the first antenna includes a first eigenfrequency and the second antenna includes a second eigenfrequency, and wherein the first eigenfrequency is substantially equal to the second eigenfrequency.

9. The antenna assembly of claim 1, wherein the mount is a plastic cover including a back surface and wherein the second antenna is one of attached to the back surface of the cover and structurally incorporated into the cover.

10. The antenna assembly of claim 1, wherein the first antenna comprises first conducting paths that are arranged on a rigid substrate, and wherein the second antenna comprises second conducting paths arranged on a flexible substrate.

11. The antenna assembly of claim 1, wherein the second antenna is statically direct current (DC) decoupled from a surrounding thereof, and wherein the second antenna is DC decoupled from the first antenna.

12. The antenna assembly of claim 1, wherein the second antenna is further configured to provide the wireless coupling by setting up a decay of the time-varying field perpendicular to the first direction.

13. The antenna assembly of claim 1, wherein the second antenna is configured to set up the decay through respectively adjusted parameters selected from the group consisting of: (i) dimensions in the plane substantially perpendicular to the first direction, (ii) a second eigenfrequency of the second antenna, and (iii) the distance along the first direction.

14. The antenna assembly of claim 1 wherein the first antenna and the second antenna are configured to be positioned within a vehicle.

15. The antenna assembly of claim 14 wherein the first antenna and the second antenna are arranged to be operatively coupled to a vehicle computer in the vehicle and to be wirelessly coupled to a portable communication device.

16. An antenna assembly for providing wireless coupling to a remote antenna, the antenna assembly comprising:
a first antenna comprising an interface and being configured to provide the wireless coupling along a first direction by transceiving a time-varying field, the interface for being connected to electric circuitry for controlling the transceiving; and
a second antenna for being fixedly attached to a mount and spaced at a distance along the first direction from the first antenna, the second antenna being configured to provide the wireless coupling by setting up a decay of the time-varying field along the first direction and to operate as a passive electrical element.

17. The antenna assembly of claim 16 wherein:
the first antenna comprises substantially planar first conducting paths being arranged substantially orthogonal to the first direction, and
the second antenna comprises substantially planar second conducting paths being arranged substantially orthogonal to a second direction.

18. The antenna assembly of claim 17, wherein the first conducting paths include first planar dimensions and the second conducting paths include second planar dimensions, the second planar dimensions being larger than the first planar dimensions; and wherein a number of first planar conducting planar paths is different than a number of second planar conducting paths.

19. The antenna assembly of claim 16 wherein the first antenna and the second antenna are arranged to be operatively coupled to a vehicle computer in a vehicle and wirelessly coupled to a portable communication device.

20. An antenna assembly in a vehicle for providing wireless coupling to a remote antenna, the antenna assembly comprising:
a first antenna comprising an interface and being configured to provide the wireless coupling along a first direction by transceiving a time-varying field, the interface for being connected to electric circuitry for controlling the transceiving; and
a second antenna for being fixedly attached to a mount in the vehicle and spaced at a distance along the first direction from the first antenna, the second antenna being configured to provide the wireless coupling by setting up a decay of the time-varying field along the first direction and to operate as a passive electrical element.

* * * * *